United States Patent
Futral et al.

(10) Patent No.: US 8,904,162 B2
(45) Date of Patent: Dec. 2, 2014

(54) METHODS AND APPARATUS FOR PERFORMING SECURE BIOS UPGRADE

(75) Inventors: William T. Futral, Portland, OR (US); Thanunathan Rangarajan, Bangalore (IN); Raghavendra Y K, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 13/564,027

(22) Filed: Aug. 1, 2012

(65) Prior Publication Data

US 2014/0040605 A1    Feb. 6, 2014

(51) Int. Cl.
*G06F 9/00* (2006.01)
*G06F 9/445* (2006.01)
*G06F 21/57* (2013.01)

(52) U.S. Cl.
CPC .............. *G06F 9/445* (2013.01); *G06F 21/572* (2013.01)
USPC .................................... 713/2; 713/1; 717/168

(58) Field of Classification Search
CPC ....... G06F 9/00; G06F 9/445; G06F 11/1433; G06F 21/572
USPC .................................... 713/1, 2, 164; 717/168
See application file for complete search history.

(56) References Cited

U.S. PATENT DOCUMENTS

| | | | | | |
|---|---|---|---|---|---|
| 5,844,986 | A | * | 12/1998 | Davis ............................ | 713/187 |
| 5,960,445 | A | * | 9/1999 | Tamori et al. ................. | 717/168 |
| 6,581,159 | B1 | * | 6/2003 | Nevis et al. ....................... | 713/2 |
| 6,732,267 | B1 | * | 5/2004 | Wu et al. ....................... | 713/100 |
| 6,769,059 | B1 | * | 7/2004 | Qureshi et al. .................... | 713/2 |
| 7,117,376 | B2 | * | 10/2006 | Grawrock ...................... | 380/277 |
| 7,203,831 | B2 | * | 4/2007 | Wu et al. ....................... | 713/100 |
| 7,213,152 | B1 | * | 5/2007 | Gafken et ...................... | 713/187 |
| 7,337,309 | B2 | * | 2/2008 | Nguyen et al. .................... | 713/1 |
| 7,673,301 | B1 | * | 3/2010 | Righi et al. ................... | 717/172 |
| 2013/0013905 | A1 | * | 1/2013 | Held et al. ........................ | 713/2 |

OTHER PUBLICATIONS

Intel, "Intel Trusted Execution Technology", Hardware-based Technology for Enhancing Server Platform Security, Copyright 2010, pp. 1-8.
Intel Technology Journal, "UEFI Today: Bootstrapping the Continuum", vol. 15, Issue 1, 2011, pp. 1-130.
Intel Technology Journal, "UEFI Networking and Pre-OS Security", vol. 15, Issue 1, 2011, pp. 80-99.
Intel, "UEFI, PI and TCG-based firmware", White Paper by Intel Corporation and IBM Corporation, Trusted Platforms, Sep. 2009, 50 pages.

(Continued)

*Primary Examiner* — Chun Cao
(74) *Attorney, Agent, or Firm* — Barre Law Firm (57) ABSTRACT

A data processing system may comprise a primary basic input/output system (BIOS) image in a primary BIOS region and a rollback BIOS image in a rollback BIOS region. In one example method for upgrading the BIOS, the data processing system may establish a measured launch environment (MLE). In response to a BIOS update request, the data processing system may replace the primary BIOS image with a new BIOS image while running the MLE. After a reset operation, the data processing system may automatically boot to the rollback BIOS image and may use the rollback BIOS to automatically determine whether the new BIOS image is authentic. In response to a determination that the new BIOS image is authentic, the data processing system may copy the new BIOS image from the primary BIOS region to the rollback BIOS region. Other embodiments are described and claimed.

29 Claims, 7 Drawing Sheets

(56) References Cited

OTHER PUBLICATIONS

Intel, "Creating a Secure Computing Environment", Technology Brief, Intel® Trusted Execution Technology (Intel® TXT), Embedded Computing, Copyright 2009, 2 pages.
Blum Dan, "Still Can't Win the Core Wars: A Report from Black Hat", Security and Risk Management Strategies Blog, Published on Feb. 23, 2009 pp. 1-3.
Sourceforge, "PI Boot Phases" retrived from <http://sourcefroge.net/apps/mediawiki/tiancore/index.php?title-File: PI_Boot_Phases.jpg>, Dec. 9, 2011, 2 pages.
Sourceforge, "PI Boot Flow", retrieved from <http://sourceforge.net/aaps/mediawiki/tianocore/index.php?titlePI_Boot_Flow>, Dec. 9, 2011, pp. 1-3.
TCG, "TCG Storage Architecture Core Specification", Specification Version 2.00, Revision 2.00, Nov. 4, 2011, pp. 1-318.
Intel, "Intel® TXT Software Development Guide", Measured Launched Environment Developer's Guide, Document Number: 315168-008, Mar. 2011, pp. 1-112.
TCG, "TCG Storage Security Subsystem Class: Opal", Specification Version 1.00, Revision 3.00, Feb. 4, 2010, pp. 1-83.
TCG, "TCG PC Client Specific TPM Interface Specification (TIS)", Specification Version 1.21, Revision 1.00, Apr. 28, 2011, 103 pages.
Raymond Ng, "Trusted Platform Module", TPM Fundamental, APTISS Aug. 12, 2008, pp. 1-40.
TCG EFI Protocol, "TCG EFI Protocol Specification", for TPM Family 1.1 or 1.2, Version 1.20 Final, Revision 1.00, Jun. 9, 2006, pp. 1-18.
Wojtczuk et al., "Attacking Intel® Trusted Execution Technology" Invisible Things Lab, Black Hat DC, Washington, DC, USA, Feb. 18-19, 2009, 122 pages.
Intel, "Intel® Platform Innovation Framework for EFI Pre-EFI Initialization Core Interface Specification (PEI CIS)", A Foundation Specification, Draft for Review, Version 0.9, Sep. 16, 2003, pp. 1-196.
UEFI, "Unified Extensible Firmware Interface Specification", Version 2.3.1, Errata A, Sep. 7, 2011, 2214 pages.
Mark Ryan, "Introduction to the TPM 1.2", University of Birmingham, Comments welcome, Draft of Mar. 24, 2009, Mar. 24, 2009, pp. 1-17.

\* cited by examiner

| | State | P/R | Rollback | Update | Secrets | Authentic? | P | R | |
|---|---|---|---|---|---|---|---|---|---|
| 200 | S | P | N | N | Y | Y | A | A | |
| 202 | S | P | N | N | Y | Y | B | A | |
| 204 | S | P | Y | Y | Y | Y | B | A | |
| 206 | R1 | R | Y | Y | Y | Y | B | A | |
| 208 | R1A | R | Y | Y | Y | Y | B | A | 290 |
| 210 | R1 | R | Y | Y | Y | Y | B | B | |
| 212 | R1 | R | N | N | N | Y | B | B | |
| 214 | R2 | P | N | N | N | Y | B | B | |
| 220 | R2 | P | N | N | Y | Y | C | B | |
| 222 | R2 | P | Y | Y | Y | Y | C | B | |
| 224 | R3 | R | Y | Y | Y | Y | C | B | 292 |
| 226 | R3A | R | Y | Y | Y | N | C | B | |
| 228 | H | - | - | - | - | - | C | B | |

| | State | P/R | Rollback | Update | Secrets | Authentic? | P | R | |
|---|---|---|---|---|---|---|---|---|---|
| 230 | S | P | N | N | N | Y | A | A | |
| 232 | S | P | N | N | N | Y | B | A | |
| 234 | S | P | Y | Y | N | Y | B | A | |
| 236 | R1 | R | Y | Y | N | Y | B | A | 294 |
| 238 | R1A | R | Y | Y | N | Y | B | A | |
| 240 | R1 | R | Y | Y | N | Y | B | B | |
| 242 | R1 | R | N | N | N | Y | B | B | |
| 244 | R2 | P | N | N | N | Y | B | B | |

FIG. 5

METHODS AND APPARATUS FOR PERFORMING SECURE BIOS UPGRADE

TECHNICAL FIELD

The present disclosure relates in general to data processing systems. More particularly, the present disclosure relates to methods and apparatus for securely upgrading a basic input/output system in a data processing system.

BACKGROUND ART

Application software typically provides the functionality that end users want from a data processing system. The application software typically runs on top of system software. To establish a trusted operating environment, a data processing system may measure and authenticate the system software components before those components are executed. The system software components may include, without limitation, an operating system (OS) and system initialization code that is executed prior to the OS. The system initialization code may also be referred to as firmware. The system initialization code may include, without limitation, a startup authenticated code module (ACM) and a basic input/output system (BIOS). For purposes of this disclosure, the startup ACM may be referred to simply as the ACM.

The ACM is an always trusted code module that is responsible for validating the platform that it is running on and then measuring the current system BIOS. The ACM is also responsible for authenticating the BIOS and for controlling access to the memory (e.g., by locking or unlocking a memory controller). The ACM is started by the root of trust—the central processing unit (CPU). The ACM may include a value that attests to the authenticity of the ACM. That value may be encrypted with a key that corresponds to another key stored in the data processing system. Typically, the ACM and the BIOS are both programmed at the factory, and when the ACM runs for the first boot of the data processing system, the ACM measures the BIOS and stores this measurement in the system's trusted platform module (TPM). For all subsequent boots, the ACM re-measures the BIOS, and as long as the BIOS image remains the same, the ACM will find the BIOS to be authentic, because the measurement remains unchanged.

The system software may also include a virtual machine monitor (VMM). The VMM may be launched after the system initialization code but prior to the OS, for instance. An operating environment in which the system software has been measured before being launched may be referred to as a measured launch environment (MLE). If the measurements for the system software have also been authenticated, the operating environment may also be referred to as a trusted operating environment. By establishing an MLE or a trusted operating environment, the data processing system provides an assurance that the data processing system is secure and has not been compromised by malware. After the MLE has been established, the data processing system may execute the application software. When the application software in the data processing system performs mission critical functions, the user or users of the data processing system may rely on the data processing system to be available practically twenty-four hours per day, seven days per week. For example, server farms and data centers may utilize data processing systems that are expected to have less than 5.26 minutes of downtime per year. A data processing system with that degree of availability or reliability may be said to provide 99.999% (or "five nines") availability. For purposes of this disclosure, a data processing system that has established an MLE may be said to be running an MLE, and application software may be said to be running on an MLE when that software is running on a data processing system that is running an MLE. Similarly, a data processing system that has established a trusted operating environment may be said to be running a trusted operating environment, and application software may be said to be running on a trusted operating environment when that software is running on a data processing system that is running a trusted operating environment.

Components of the MLE (e.g., the OS) and user applications can store secrets in memory. A secret is a piece of data that must not be compromised or accessed by malware (e.g., passwords, private/public key pairs, system registry values). When secrets are present in memory, the platform should only allow trusted modules to access the memory. For instance, if the system is reset with secrets in memory, then the platform should not allow an untrusted BIOS to access the memory. The ACM may ensure that an untrusted BIOS cannot access the memory by locking out the memory controller, so that the BIOS can no longer program or alter the memory subsystem.

Sometimes it becomes necessary to update the BIOS in a data processing system. As recognized herein, downtime could be reduced or avoided if it were possible to upgrade the BIOS while the OS is running without causing any adverse consequences. However, when the BIOS is updated, the measurement of the BIOS changes. Consequently, if the BIOS is upgraded while the data processing system is running an MLE, when the data processing system is subsequently reset, the upgraded BIOS may fail the authentication process. For example, if a BIOS upgrade occurs with secrets in memory and the system is then reset, the ACM will lock the memory controller out because the new BIOS has a different measurement than its predecessor.

In a conventional data processing system, when the measurement of the BIOS changes, the ACM will typically follow two policies:

1) if the MLE did not store any secrets in memory in the last boot, then there is nothing for the system to protect. Hence the ACM "auto-promotes" the new BIOS. In this auto-promotion process, the ACM computes the measurement of the new BIOS and stores that new measurement in the TPM. After the upgraded BIOS has been measured and auto-promoted, the data processing system may then be booted to an MLE.

2) If the MLE has secrets stored in memory, then on the next boot the ACM must not allow the new BIOS to access memory and potentially compromise system secrets. Consequently, the ACM locks the memory controller so that the new BIOS cannot program the memory subsystem and access memory.

When the second policy applies, the BIOS may be unable to complete the boot process. For purposes of this disclosure, when a data processing system cannot complete the boot process, the data processing system may be said to be bricked. Thus, BIOS authentication failure may result in a bricked state. A bricked system is rendered useless because it can no longer boot to the OS. Moreover, to recover from this kind of failure, it may be necessary for the data processing system to receive service from the original equipment manufacturer (OEM) at the OEM's facilities. Consequently, for a data processing system that is configured to provide an MLE, a more difficult and/or time consuming process is typically used to update the BIOS. One approach is to bring the data processing system and an administrator into the same location (e.g., the OEM's factory), and for the administrator to then manually tear down the MLE prior to upgrading BIOS. Tearing down the MLE involves re-provisioning the contents of the TPM device, using a special software tool in the OEM's factory. This process ensures that the stored signatures/measurements—and the launch control policies (LCPs) that cause these measurements to be applied during the boot process—are rendered invalid, so that the newly upgraded BIOS can pass the boot process and be freshly measured for subsequent MLE launches. After the MLE has been torn down, the ACM may then measure and auto-promote the upgraded BIOS.

Another approach is for the OEM to configure the data processing system with a secondary BIOS, in addition to the primary BIOS. The secondary BIOS may be referred to as a fail-safe BIOS. The OEM may also include a trusted platform module (TPM) in the data processing system, and the OEM may store a measurement for the fail-safe BIOS in a special storage area in the TPM. Subsequently, the ACM measures the fail-safe BIOS and compares that measurement with the value stored in the TPM. The OEM may also configure the data processing system with an ACM that automatically authenticates and launches the fail-safe BIOS based on a built-in software policy. If the ACM chooses to follow the fail-safe path, the data processing system may use the fail-safe BIOS to boot to an MLE.

However, the fail-safe BIOS can only be changed by the OEM. Furthermore, the fail-safe BIOS must be compatible with the server platform components. Consequently, if hardware changes are made to the data processing system after the data processing system has been delivered to the customer, the fail-safe BIOS may be rendered inoperative. Consequently, any subsequent attempt to upgrade the primary BIOS may result in a bricked data processing system. For instance, changing the CPU or introducing a new interconnect frequency may render the fail-safe BIOS incompatible with the platform and cause the fail-safe BIOS itself to fail to boot successfully.

BRIEF DESCRIPTION OF THE DRAWINGS

Features and advantages of the present invention will become apparent from the appended claims, the following detailed description of one or more example embodiments, and the corresponding figures, in which:

DESCRIPTION OF THE EMBODIMENTS

The present disclosure describes methods and apparatus for upgrading a BIOS in a data processing system while the data processing system is running an MLE. For purposes of this disclosure, the provider of the original BIOS image and any trustable updated BIOS images is referred to as an independent BIOS vendor (IBV), while the provider of the processor and the platform controller hub is referred to as an independent platform vendor (IPV). In another embodiment, a single entity serves as the IBV and the IPV. An OEM may use components from the IBV and the IPV to build the data processing system. In one scenario, the OEM obtains the processor and the PCH as part of a motherboard. In other scenarios, the OEM may obtain the one or more of those components separately.

As described in greater detail below, in one embodiment, the data processing system includes a primary BIOS image in a primary BIOS region and a rollback BIOS image in a rollback BIOS region. The data processing system may establish an MLE. In response to a BIOS update request received while running the MLE, the data processing system may replace the primary BIOS image with a new BIOS image. After a reset operation, the data processing system may automatically boot to the rollback BIOS image and may automatically determine whether the new BIOS image is authentic. In response to a determination that the new BIOS image is authentic, the data processing system may copy the new BIOS image from the primary BIOS region to the rollback BIOS region.

As indicated above, in a conventional data processing system with an ACM, all BIOS measurements are performed by the ACM. By contrast, according to the present disclosure, a BIOS measurement may be performed by the BIOS. In other words, the BIOS may perform self-measurement. For instance, As described in greater detail below, when the BIOS is upgraded, the rollback BIOS may measure the upgraded BIOS image and compare that measurement with an embedded measurement in the upgraded BIOS. The embedded measurement may be a signed hash value, for example.

Figure 1:
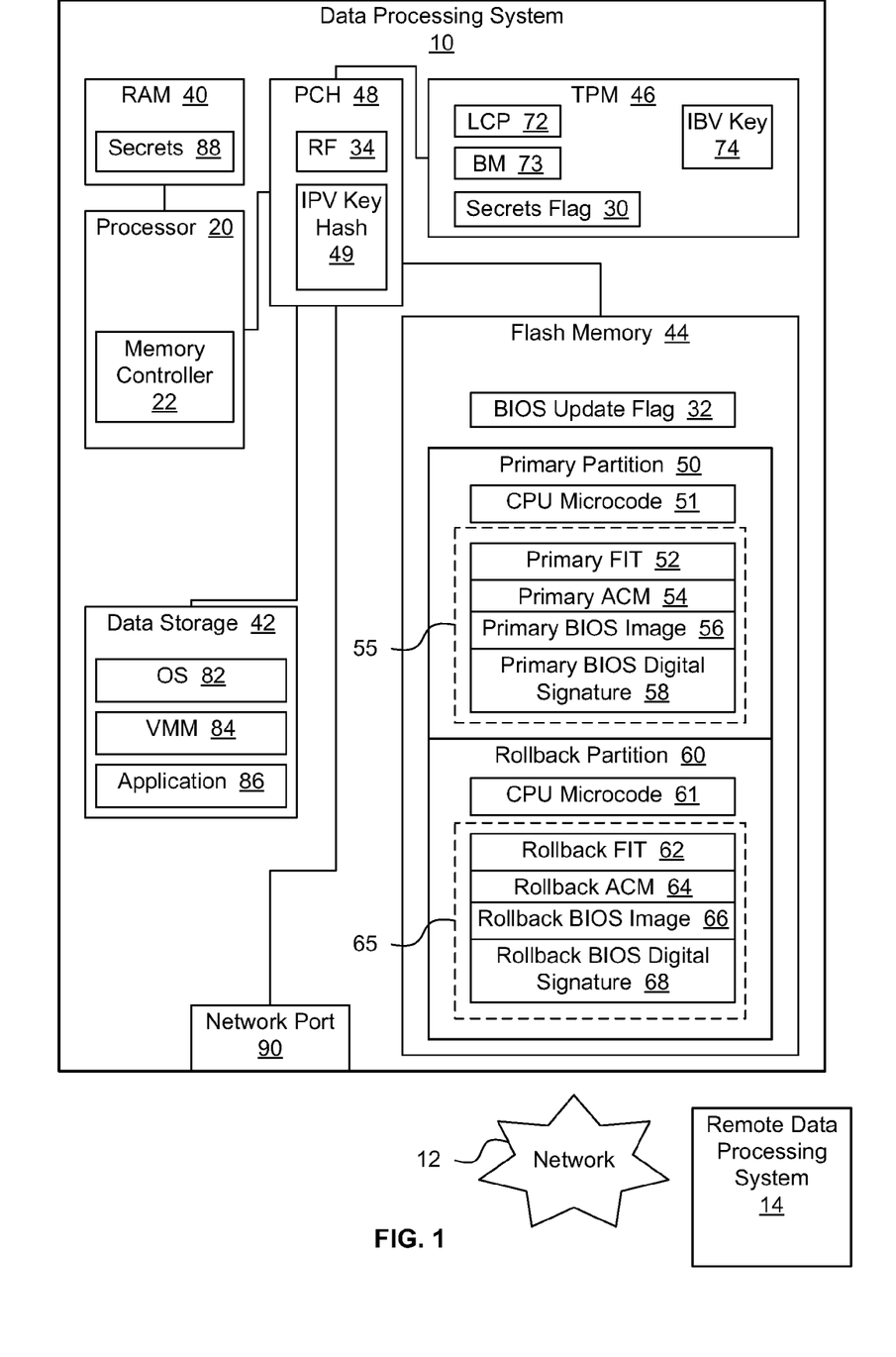
FIG. 1 is a block diagram of a data processing system with control logic for upgrading the BIOS of the data processing system while the data processing system is running an MLE, according to at least one example embodiment.

FIG. 1 is a block diagram of a data processing system 10 that includes at least one processor 20 in communication with components such as random-access memory (RAM) 40, data storage 42, nonvolatile memory 44, and a network interface or network port 90. The processor may include microcode 21 that is more or less hardwired in to the processor. This microcode may be referred to as the CPU microcode, and it may include logic for performing built-in self test (BIST), initializing core functionality within the CPU, and initializing the ACM. In one or more embodiments, the nonvolatile memory is implemented as flash memory, and the data storage device is implemented as one or more non-volatile mass storage devices (e.g., one or more hard disk drives). The processor may also be communicatively coupled to additional components, such as a TPM 46, video controllers, universal serial bus (USB) controllers, and input devices such as a keyboard, a mouse, a camera, etc. In the embodiment of FIG. 1, the processor includes a memory controller 22. In some embodiments, the processor may be part of a single core or multi-core CPU, the data processing system may include additional CPUs, and the CPUs may communicate with each other and with one or more of the other components directly or via one or more intermediate components, such as a platform controller hub (PCH) 48. Alternatively or in addition, the data processing system may include additional hubs or bridges, such as a memory controller hub, an input/output (I/O) controller hub, etc., for communicatively coupling system components. Some or all of the hubs, bridges, and related components may be referred to collectively as a chipset. The data processing system may use the network interface to communicate with one or more remote data processing systems 14 via one or more networks 12. The networks may include a local area network (LAN), a wide area network (WAN), or any suitable combination of LANs and/or WANs.

In one or more embodiments, the data processing system supports the security features known as Intel Trusted Execution Technology (TXT). (Intel is a registered trademark of Intel Corporation.)

In the embodiment of FIG. 1, the flash memory includes a primary partition 50 containing a primary BIOS package 55 and a rollback partition 60 containing a rollback BIOS package 65. The primary BIOS package includes a primary firmware interface table (FIT) 52, a primary ACM 54, a primary BIOS image 56, and a primary BIOS digital signature 58. The rollback BIOS package includes a rollback FIT 62, a rollback ACM 64, a rollback BIOS image 66, and a rollback BIOS digital signature 68. The primary and rollback BIOS packages may also be referred to respectively as primary and rollback BIOS binaries.

In one embodiment, an OEM builds the data processing system by combining hardware (e.g., the processor and a motherboard with the PCH) from an IPV and software (e.g., the primary BIOS package) from an IBV.

In one embodiment, the IBV obtains a private/public key pair, and the IBV uses the private key to sign the primary BIOS image. In other words, when the IBV creates the primary BIOS package, the IBV generates the digital signature of the BIOS image by calculating a hash value for the BIOS image and using the private key and the calculated hash value to generate the signature. The IBV may then store the signature in a predetermined field (e.g., "Self's Digital Signature") within the BIOS package.

In another embodiment, the IBV may also store the public key that corresponds to that private key within the BIOS package. Thus, the BIOS package may contain two special fields: the IBV public key and the digital signature created using the IBV's corresponding private key. In addition, the OEM may program the hash of the IBV public key in TPM during provisioning/build. After a BIOS update, the rollback BIOS retrieves the hash of the IBV public key from the TPM, and the rollback BIOS retrieves the public key from the new BIOS image in the primary partition. The rollback BIOS then computes the hash of that public key and determines whether it matches the hash value from the TPM. Thus, the rollback BIOS authenticates the public key embedded in the new BIOS. Next, the rollback BIOS uses the (authenticated) public key to decrypt the digital signature and extract the embedded hash of the new BIOS. The rollback BIOS then computes the actual hash of the entire new BIOS image and verifies the actual hash value against the embedded hash obtained value. If those values match the new BIOS is authentic. According to this embodiment, the public key will be embedded in the BIOS image, so both the primary and the rollback BIOS packages will be carrying it. The TPM provisioning is done to carry the hash of the public key. This two-step process provides for additional safety.

In one embodiment, the IPV obtains a different private/public key pair, and the IPV uses its private key to sign the ACM. In addition, the IPV stores a hash of the public key in the PCH during fabrication of the PCH. Consequently, the PCH contains a more or less hardwired hash of the IPV's public key. That hash value is illustrated in FIG. 1 as IPV key hash 49. The IPV's public key may also be referred to as the chipset public key. Also, the IPV may store a copy of that public key in the ACM (e.g., in the header). During the boot process, the data processing system may verify the chipset public key. For instance, the CPU microcode may (a) hash the chipset public key contained in the ACM module header, (b) extract the hash of the public key from the PCH, and (c) compare those two hash values to verify the key. During boot the data processing system may also verify the ACM module. For instance, the CPU microcode may (a) decrypt the ACM signature block using chipset public key to extract the ACM hash, (b) compute the hash of ACM (header+body), and (c) compares those two hash values to verify that the ACM has not been modified. In one embodiment, processes described above ensure that the ACM is specific to a particular platform family. Since the PCH or chipset is an inherent component of the platform, the public key that the PCH stores also becomes an inherent property of the platform.

The OEM may use any suitable technique to obtain the public keys from the IPV and the IBV. When the OEM is manufacturing or configuring the data processing system for delivery to the customer, the OEM may store the IBV's public key 74 in the TPM.

During the build process, the OEM may also store software (e.g., the ACM) from the IPV in the data processing system. During the build process, the OEM may also cause the ACM to measure the primary BIOS image and store that BIOS measurement (BM) 73 in the TPM. In one embodiment, the BM is a hash value computed by a predetermined hash routine. That predetermined hash routine may also be used compute the other hash values referenced herein. For example, the cryptographic hash function referred to as SHA-1 may be used as the predetermined hash routine (where "SHA" stands for "secure hash algorithm"). In alternative embodiments, one or more other hash algorithms may be used.

The BIOS partitions in flash memory may also include platform microcode (51, 61). The platform microcode may also be referred to as add-on logic or a microcode patch. The platform microcode may be used to enable or disable certain features, to fix bugs, etc. The platform microcode may be supplied to the IBV by the IPV, and the IBV may include the platform microcode as part of the BIOS image. The BIOS may download the platform microcode from flash into the CPU while the BIOS is booting. The platform microcode may serve as a core root of trust for measurement (CRTM).

The data processing system may also include other system software components that are authenticated before being launched, in the process of building an MLE or a trusted operating environment. The system software components may include an OS 82 and a VMM 84, for instance. To establish the chain of trust necessary for the MLE, each component may measure its successor before handing off control to that successor. In the embodiment of FIG. 1, some or all of the instructions or code modules which, when executed, implement the OS and the VMM may be stored in the data storage and copied to RAM for execution. The OS may include an OS loader that is authenticated before the BIOS passes control to the OS loader. Various software applications 86 may also be stored in the data storage and copied to RAM for execution.

The data processing system may use a variety of parameters, variables, flags, or switches to control the BIOS update process. These parameters may include a secrets flag 30, a BIOS update flag 32, and a rollback flag (RF) 34, for instance. In one embodiment, these parameters are stored in one or more components, such as the PCH (or "chipset"), the flash memory, and the TPM. For instance, in one embodiment, the BIOS comports with version 2.3.1 of the Unified Extensible Firmware Interface (UEFI) Specification (which was published on Apr. 8, 2011, and is available at www.uefi.org/specs), and the data processing system implements the BIOS update flag as a UEFI firmware variable, while using a top swap (TS) switch or strap in the PCH for the rollback flag, and protected storage in the TPM for the secrets flag.

During operation, components such as the OS and user applications that run on the system may store secrets 88 in RAM. Those secrets may include private keys, user passwords, and other data items that are vital to the system's security.

Also, in the embodiment of FIG. 1, the TPM includes a BIOS authentication policy 72 and the public key 74 of a public/private key pair of the IBV. The BIOS authentication policy may also be referred to as a launch control policy (LCP) 72. The LCP includes settings for attributes such as which operations are to be performed in response to authentication failure. For example, the LCP may directly trigger a roll back to start booting from the secondary partition to authenticate a newly updated BIOS.

Before or during the authentication process, the ACM may retrieve the LCP settings and operate accordingly. The ACM may include a value that attests to the authenticity of the ACM. That value may be encrypted with a private key that corresponds to the IPV's public key 49.

Figure 2A:
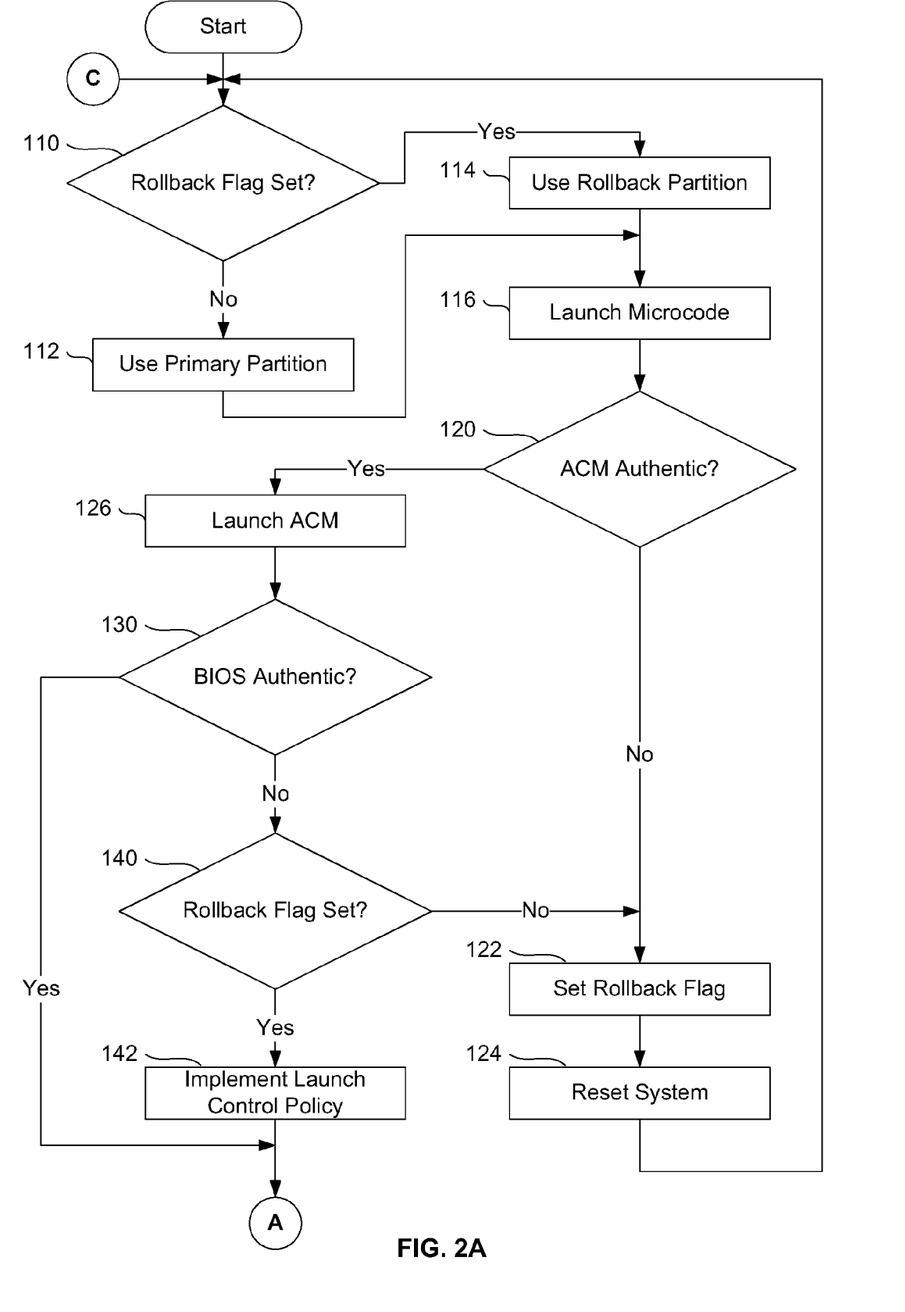
FIGS. 2A, 2B, and 2C present a flowchart of an example process for upgrading the BIOS in the data processing system of FIG. 1.
Figure 2B:
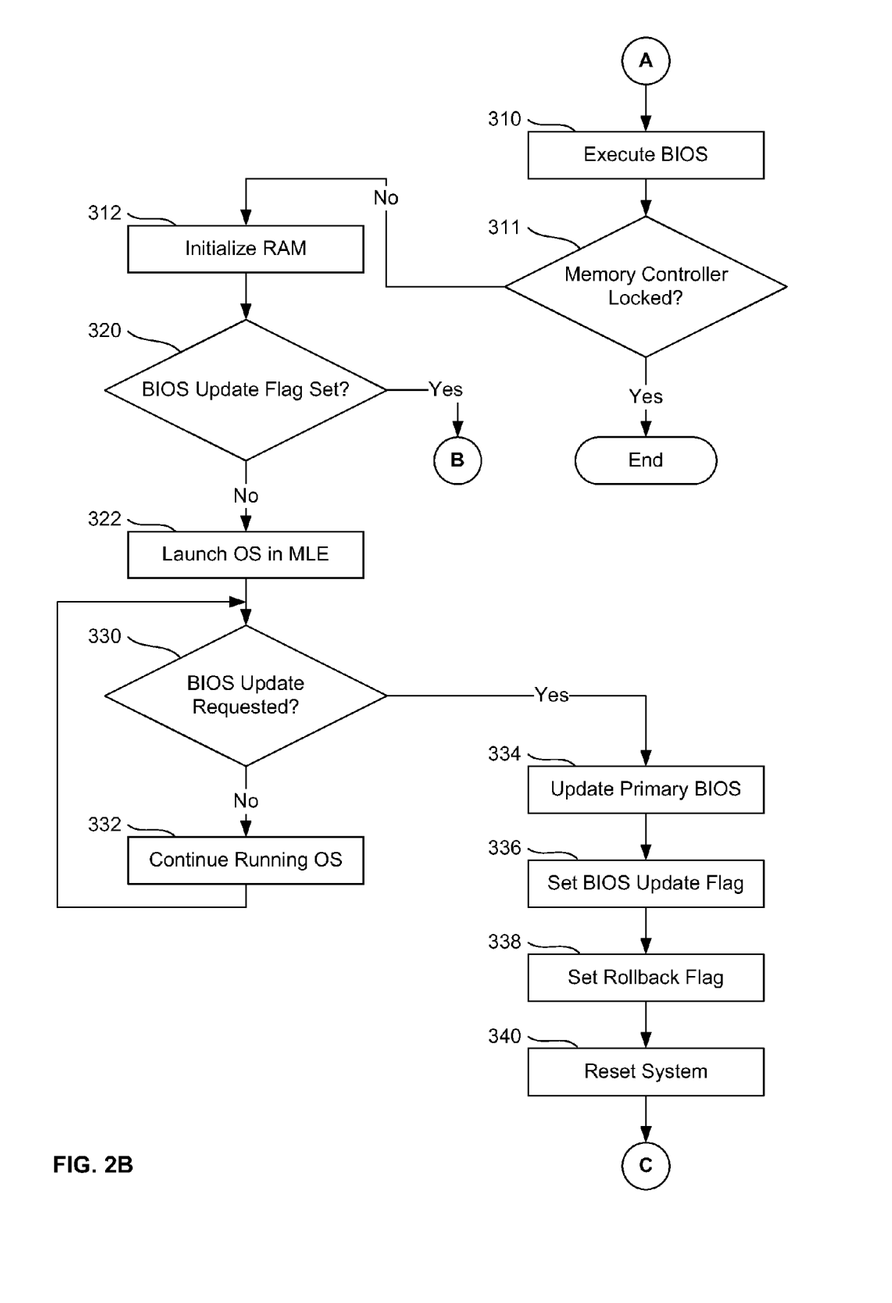
Figure 2C:
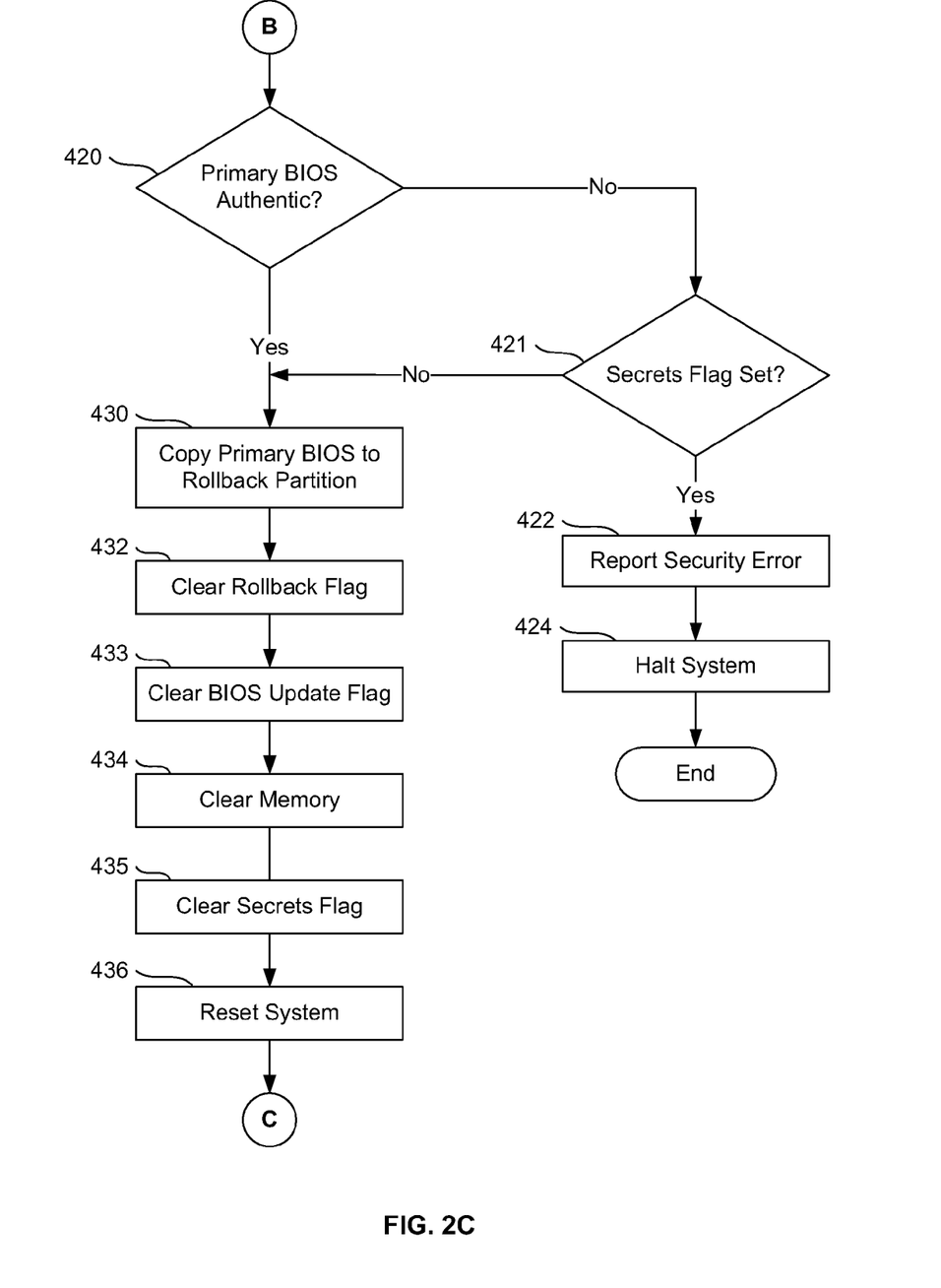

FIGS. 2A, 2B, and 2C present a flowchart of an example process for upgrading the BIOS in the data processing system of FIG. 1. The process of FIG. 2A starts with the data processing system being powered on or reset. In response, as shown at block 110, the PCH may detect whether or not the rollback flag has been set, with the PCH causing either the primary partition or the rollback partition to be used for the boot process, as indicated at blocks 112 and 114. For purposes of this disclosure, the partition selected by the PCH may be referred to as the active partition. Accordingly, the components in the active partition may also be referred to as active, even if those components are not being executed. As indicated above, in one embodiment, the rollback flag is part of the PCH.

As shown at block 116, the processor may then launch the CPU microcode as part of the internal initialization routine of the processor. Once the processor has initialized itself, the CPU microcode causes the processor to search the active partition of the flash memory to determine precisely where the ACM binary image is located in that partition. The CPU microcode then authenticates this ACM binary image using the signature from the ACM and the IPV's public key from the PCH, as shown at block 120. In one embodiment, to authenticate the ACM, the CPU microcode (a) hashes the ACM, (b) uses the public key to decrypt the embedded signature, and (c) compares the decrypted signature with the hash. For purposes of this disclosure, unless expressly provided otherwise, the term "signature" denotes a digital signature containing data for demonstrating the authenticity of a digital message. This technique ensures that the ACM came from the known IPV because, when the public key of the IPV is used to decrypt the signature, the resulting hash value will not match the actual hash value unless the private key of the IPV was used to create that signature.

If the ACM is not authentic, the CPU microcode may set the rollback flag and reset the data processing system, as indicated at blocks 122 and 124. After the processor is reset, the process may return to block 110, with the PCH detecting whether the rollback flag is set and proceeding accordingly, as described above.

However, referring again to block 120, if the ACM is authentic, the CPU microcode may launch the ACM, as indicated at block 126. The ACM may read the FIT to determine the specific location and size of the active BIOS image. As shown at block 130, the ACM may then determine whether the active BIOS image is authentic. In one embodiment, to authenticate the BIOS image, the CPU microcode hashes the BIOS image using the predetermined hash routine referenced above and compares the resulting hash value with the BIOS measurement in the TPM. If the active BIOS image is authentic, the process may pass through page connector A to FIG. 2B, which shows the BIOS being executed and other operations. However, if the active BIOS image is not authentic, the ACM may determine whether the rollback flag is set, as shown at block 140. If the rollback flag is not set, the ACM may set the rollback flag and reset the system, as shown at blocks 122 and 124. As described in greater detail below, the data processing system may then try to boot using the rollback BIOS.

However, if the rollback flag is already set, the ACM may execute operations specified by the LCP, as shown at block 142.

Figure 3:
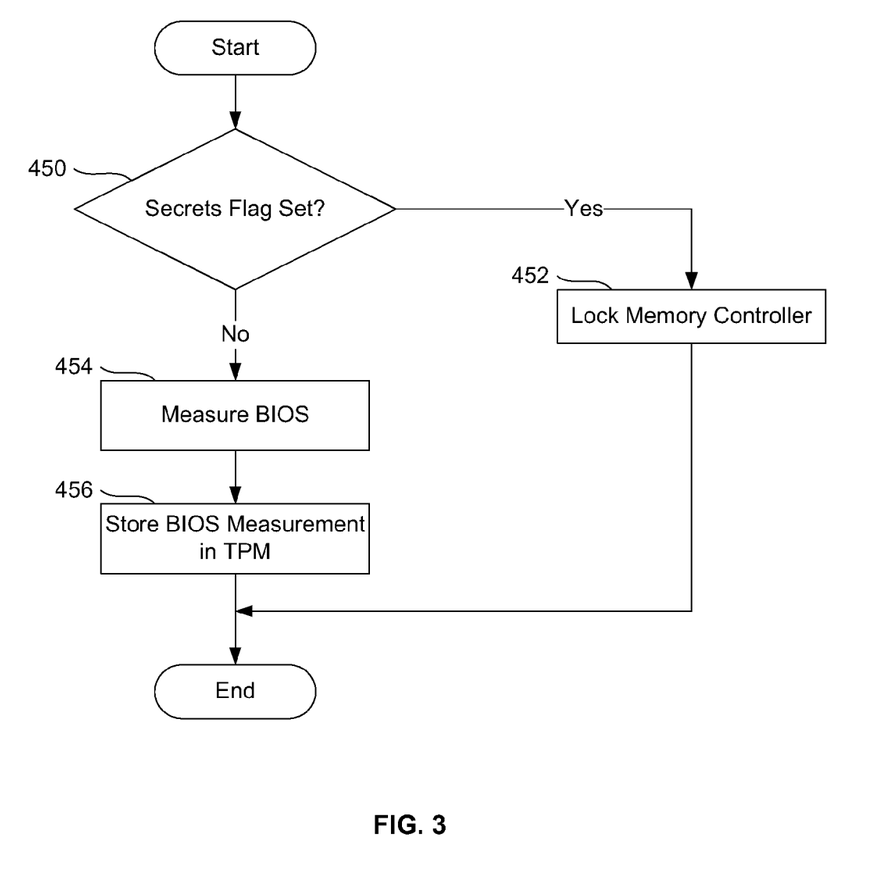
FIG. 3 presents a flowchart of a process for implementing an example launch control policy.

FIG. 3 presents a flowchart of a process for implementing an example LCP. This flowchart expands upon the operations summarized at block 142. According to the LCP of FIG. 3, as shown at block 450, the ACM may determine whether there are any secrets in memory, based on the secrets flag, for example. If there are secrets in memory, the ACM may lock the memory controller, as shown at block 452. However, if there are no secrets in memory, the ACM may measure the new BIOS image using the predetermined hash routine, as shown at block 454. The ACM may then store the new BIOS measurement in the TPM, as shown at block 456. Thus, if the rollback flag is already set and the active BIOS fails authentication, these conditions indicate that the rollback BIOS is currently active, and is also not authentic. In this case, if there are any secrets in memory, the LCP may specify that the ACM should lock the memory controller, so that the unauthenticated (rollback) BIOS will be barred from accessing those secrets. Subsequently, as described in greater detail below, after the rollback BIOS executes and authenticates the new BIOS, the rollback BIOS may configure the system (e.g., by clearing the secrets flag) so that the ACM will not lock the memory controller on the next boot.

Alternatively or in addition, the ACM may implement the policy from the LCP when authentication fails during the normal (non-rollback) flow. For instance, referring again to block 140 of FIG. 2A, if the BIOS fails authentication and the rollback flag is not set, instead of setting the rollback flag (as shown at block 122), the ACM could retry a few times to boot from the primary partition using any number of other alternate recovery schemes provided for by the LCP, and the ACM could switch the rollback flag on only as a last resort when all else fails to authenticate the primary BIOS partition.

When the process of FIG. 3 ends, control may then flow from block 142 of FIG. 2A through page connector A to block 310 of FIG. 2B. The ACM may then launch the active BIOS image, as shown at block 310. However, as indicated at block 311, if the memory controller has been locked, the active BIOS image may be unable to complete execution, and the data processing system may stop execution, possibly in a bricked state. If the memory controller has not been locked, the BIOS may initialize the RAM, as shown at block 312, and perform various other operations for booting the data processing system. For instance, in one embodiment, the primary BIOS, during its execution, configures the serial peripheral interfaces of the PCH to set the rollback partition to read-only, thereby protecting the rollback partition. For example, the primary BIOS may use protection registers to specify BIOS ranges to be locked by the PCH, and primary BIOS may configure those registers to lock the rollback region.

When finished executing the boot code, the data processing system will have succeeded in authenticating and executing the ACM and the active BIOS image. The data processing system will therefore be running an MLE.

The BIOS may then determine whether the BIOS update flag is set, as shown at block 320. If the BIOS update flag is not set, the BIOS may then authenticate and launch an OS (or multiple OSs) and/or a VMM, as shown at block 322, thereby adding the OS and the VMM to the MLE. Application software may then be launched on top of the MLE.

Eventually, as shown at block 330, the data processing system may receive a BIOS update request. If no BIOS update request is received, the process may loop through blocks 332 and 330 indefinitely, with the application software providing functionality for the end user or users.

When the data processing system receives the BIOS update request, the process may pass from block 330 to block 334, with the data processing system loading the updated or new BIOS into the primary partition, in place of the current BIOS. For example, the BIOS update request may come from an OS service, from application software, or from a tool. The request may by started by a system administrator, possibly in a manner like that used for pushing OS patches and the like to managed systems. When the data processing system receives a BIOS update request, the request may invoke the runtime portion (e.g., a driver execution environment (DXE)) of the BIOS. The DXE may use systems management mode (SMM) to update the primary partition with the new BIOS image. The new BIOS may include a new ACM, a new FIT, and/or a new main BIOS image. As shown at blocks 336 and 338, the DXE (in SMM) may then set the BIOS update flag and the rollback flag. The BIOS update flag may serve as an indication to the BIOS that the BIOS image in flash has just been updated.

In another embodiment, rather than setting the BIOS update flag after storing the new BIOS and before resetting the system, the data processing system may rely on the ACM to trigger a rollback automatically, in response to authentication failure of the (new) primary BIOS.

In the embodiment of FIG. 1, the rollback flag is a bit or hardware strap that resides in the PCH. In one embodiment, the DXE sets the rollback flag after the primary partition has been successfully updated with the new BIOS image. In another embodiment, the ACM could set the rollback flag when the primary partition fails authentication, which would typically happen immediately after a BIOS update. The ultimate goal of the rollback flag is to force the system to boot from the (already authenticated) rollback partition whenever the BIOS is updated, so that a trusted boot process can take place on the next boot. In one embodiment, the rollback flag can only be modified by trusted agents. For instance, rollback flag can be set (a) by the DXE (i.e., an authenticated BIOS module) before the reset, or (b) by the ACM on the next boot after the update. This restriction ensures that only an authenticated agent can invoke the call to set or reset this flag. Thus, the BIOS may need to make a request to the ACM to set the Rollback flag.

The DXE or the BIOS update utility/tool may then reset the data processing system, as shown at block 340. The reset is intended to force the newly updated BIOS to become effective after the update.

The process may then pass through page connector C back to FIG. 2A, with the data processing system authenticating and booting to the rollback partition, as described above. If that process is successful, the process will eventually return to block 320. At this point, if the BIOS was just updated, the BIOS update flag will still be set. Consequently, the process will then pass from block 320 through page connector B to FIG. 2C.

As shown at block 420, the rollback BIOS may then authenticate the new BIOS, which will be stored in the primary partition. In one or more embodiments, the rollback BIOS includes a function called Self_Auth, and that function is used to determine whether the primary BIOS should be trusted.

Figure 4:
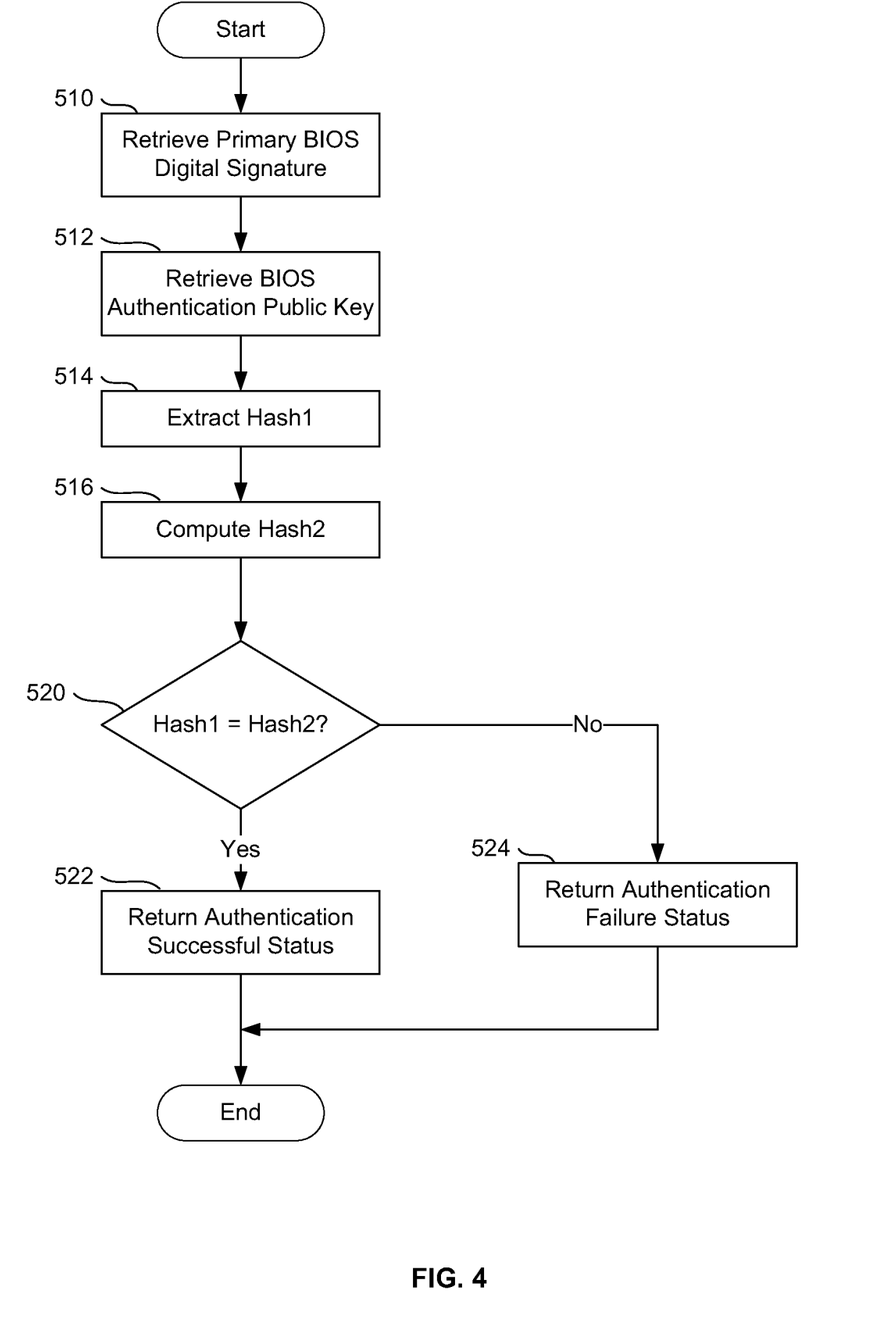
FIG. 4 presents a flowchart of a process for authenticating an upgraded BIOS according to at least one example embodiment.

FIG. 4 presents a flowchart of an example process for authenticating a new BIOS. The process of FIG. 4 depicts in greater detail the authentication function referenced in block 420 of FIG. 2C, according to one or more embodiments. As shown at block 510, that process may start with the authentication function retrieving a signature for the new BIOS package from the primary partition. The authentication function may also retrieve a public key for the provider of the new BIOS package from the TPM, as shown at block 512. The authentication function may then use the public key to decrypt a hash value for the new BIOS image from the signature, as shown at block 514. In addition, as depicted at block 516, the authentication function may compute an actual hash value for the new BIOS image, using a formula corresponding to the formula used by the IBV to create the signature. As shown at block 520, the authentication function may then determine whether the decrypted hash value matches the actual hash value. If those values match, the authentication function may return a value indicating that authentication was successful, as shown at block 522. And if the values do not match, the authentication function may return a value indicating that authentication was not successful, as shown at block 524.

Referring again to FIG. 2C, if authentication of the new BIOS fails, the rollback BIOS may report a security error, as shown at block 422, and the rollback BIOS may then halt the system, as shown at block 424. Alternatively, the rollback BIOS may boot to a recovery shell and signal a warning to the user to signify that the system's integrity has been compromised.

However, if the new BIOS passes authentication, the rollback BIOS may automatically promote the new BIOS. In particular, the rollback BIOS may copy the new BIOS package from the primary partition to the rollback partition, as shown at block 430. The rollback BIOS may also clear the rollback flag, the BIOS update flag, the memory, and the secrets flag, as shown at blocks 432, 433, 434, and 435. In one embodiment, where the rollback flag can only be modified by the ACM, block 432 may involve the rollback BIOS calling the rollback ACM to clear the rollback flag.

Clearing the secrets flag has the effect of instructing the ACM to not lock the memory controller on the next boot, since the rollback BIOS has executed and authenticated the new BIOS. Thus, clearing the secrets flag will allow the new BIOS to boot normally on the next boot. Consequently, since the rollback BIOS enables the system to authenticate and use the new BIOS, the process of automatically trusting and using the new BIOS may be referred to as auto-promotion. As indicated above, in one embodiment, the process of auto-promotion involves (a) a mechanism by which the ACM performs BIOS authentication using a trusted copy of the BIOS itself (e.g., the rollback BIOS) as a proxy, and (b) a mechanism by which the BIOS performs self-authentication on behalf of the ACM.

After clearing the rollback flag, the BIOS update flag, the memory, and the secrets flag, the rollback BIOS may then reset the system, as shown at block 436. The process may then pass through page connector C back to FIG. 2A, and the data processing system may then boot to the primary partition, as described above.

Figure 5:
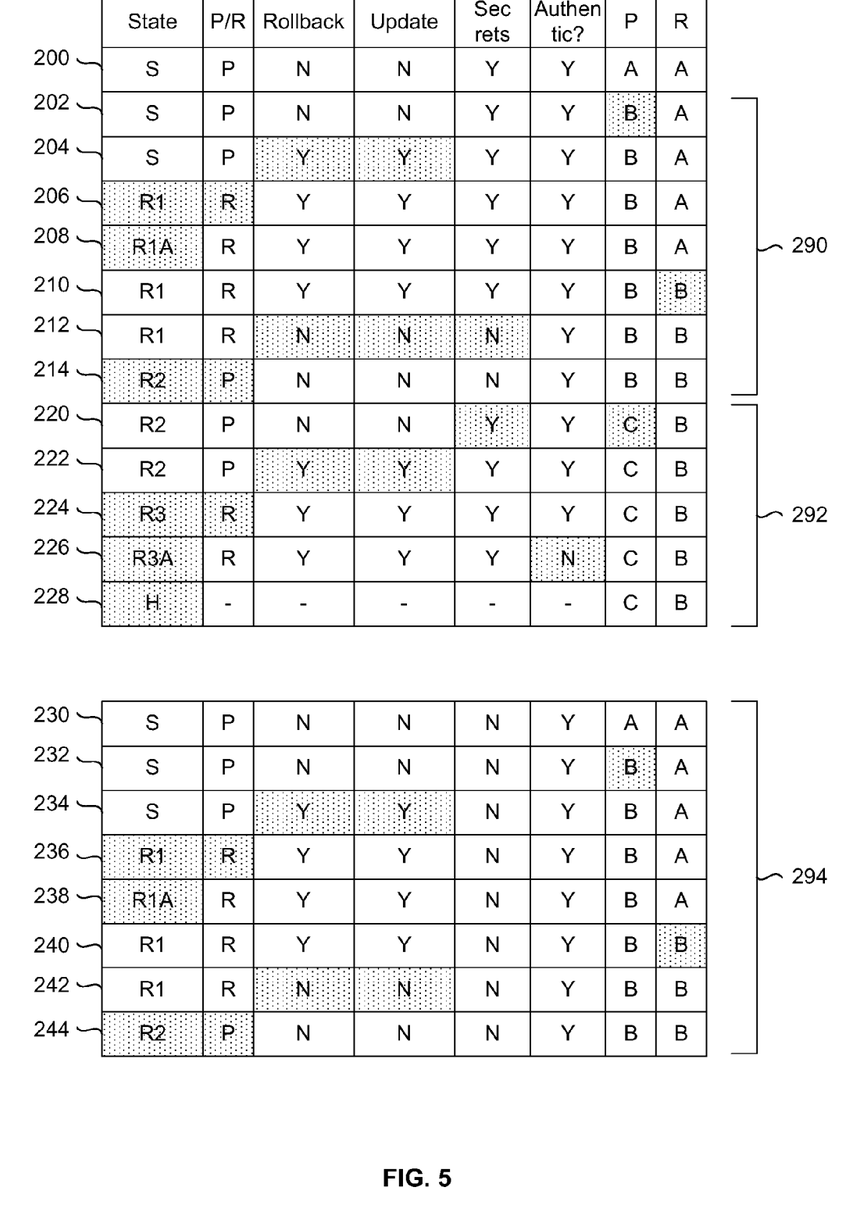
FIG. 5 presents a table that illustrates how different values, conditions, and states change at different stages of one example BIOS update process.

FIG. 5 presents a table that illustrates how different values, conditions, and states change at different stages of one example BIOS update process. Accordingly, the table of FIG.

5 may be referred to as a change table. In FIG. 5, the change table includes a sequence of columns reflecting the following attributes:

State: identifies the current state of the data processing system, where "S" denotes a standard boot process that started with no BIOS update pending, "R1" denotes a boot process following a first reset operation, "R1A" denotes an authentication function within the R1 state, "R2" and "R3" denote boot processes following additional reset operations, and "H" denotes a halted state.
    P/R: indicates whether the memory controller is using the primary partition ("P") or the rollback partition ("R");
    Rollback: indicates whether the rollback flag is set ("Y") or not ("N");
    Update: indicates whether the BIOS update flag is set ("Y") or not ("N");
    Authentic: indicates whether components have passed ("Y") or failed ("N) authentication tests;
    P: identifies different contents of the primary partition, such as BIOS package A ("A"), BIOS package B ("B"), etc.; and
    R: identifies different contents of the rollback partition.

The change table also includes three sets of rows, denoted respectively with reference numbers 290, 292 and 294. The first set pertains to a successful BIOS upgrade starting with secrets in memory. The second set pertains to an unsuccessful BIOS upgrade. And the third set pertains to a successful BIOS upgrade starting with no secrets in memory. In addition, the dotted fill in some of the cells in the change table highlights the cells that have changed from row to row.

In one or more embodiments, the change table pertains to operations performed in the data processing system of FIG. 1. In particular, the successful upgrade may start at row 200, after the data processing system has booted to an MLE, with the rollback partition containing a copy of the same BIOS package A that is stored in the primary partition. This scenario may occur, for example, when the data processing system is freshly delivered from the factory and just deployed in the field. To boot to the MLE, the data processing system may have executed steps 110, 112, 116, 120, 126, 130, 310, 312, 320, 322, 330, and 332 of FIGS. 2A and 2B, for example.

Row 202 shows that BIOS package A in the primary partition has been replaced with BIOS package B. That result may have been achieved through execution of steps 330 and 334 of FIG. 2B. Row 204 shows that the rollback and BIOS updates flags have been set, for instance as a result of steps 336 and 338 being executed. In other words, step 338 depicts the mechanism used to set the rollback flag one embodiment, where the BIOS calls the ACM to set this flag. In another embodiment, step 338 may not be used. Instead the ACM may set the rollback flag on the next boot, when the new BIOS in the primary partition fails authentication.

Row 206 shows that the data processing system has been reset, and is now accessing the rollback partition (e.g., per steps 340, 110, 114, 116, 120, 126, 130, 310, and 312). Row 208 shows the data processing system determining that the new BIOS package is authentic (e.g., per steps 320 and 420.) Rows 210 and 212 show that the new BIOS package is then copied to the rollback partition and the rollback, update, and secrets flags are cleared (e.g., per steps 430, 432, 433, and 435).

Row 214 shows that the data processing system has been reset again, and is now accessing the primary partition (e.g., per steps 436, 110, 112, 116, 120, 126, 130, 310, 312, 320, 322, 330, and 332). The successful upgrade is then complete, and the data processing system may then continue operation indefinitely.

By contrast, an unsuccessful upgrade may result if someone tries, with secrets in memory, to load a BIOS package (a) that was not signed with the same private key as the original BIOS, or (b) that fails authentication for any other reason. The example unsuccessful upgrade of FIG. 5 starts at row 220, which shows that BIOS package C has been loaded into the primary partition (e.g., per steps 330 and 334). Rows 222 and 224 show that the rollback and BIOS updates flags have been set, and the data processing system has been reset and is now pointing to the rollback partition (e.g., per steps 336, 338, 340, 110, 114, 116, 120, 126, 130, 310, and 312). Row 226 shows the data processing system determining that the new BIOS package is not authentic (e.g., per steps 320 and 420.) Row 228 shows that the data processing system has halted itself, possible after displaying, logging, or otherwise reporting an error message (e.g., as per steps 422 and 424).

As indicated above, the set of rows denoted by reference number 294 illustrates a successful BIOS upgrade, starting at row 230 with no secrets in memory. Like row 202, row 232 shows that BIOS package A in the primary partition has been replaced with BIOS package B. However, in the current scenario, since there are no secrets in memory the secrets flag is not set. Row 234 shows that the rollback and BIOS updates flags have been set. Row 236 shows that the data processing system has been reset, and is now accessing the rollback partition. Row 238 shows the rollback BIOS determining that the new BIOS is authentic. Rows 240 and 242 show that the new BIOS package is then copied to the rollback partition and the rollback and update flags are cleared. Row 244 shows that the data processing system has been reset again, and is now accessing the primary partition. Row 244 also shows that the ACM has determined that the active BIOS is authentic. The ACM will have made that determination upon reset because the rollback BIOS will have copied the new BIOS measurement into the TPM after authenticating the new BIOS, as described above with regard to block 456 of FIG. 3.

As has been described, a data processing system may load a new BIOS image to a primary partition while the data processing system is running an MLE. In addition, a rollback BIOS in the data processing system may automatically determine whether the new BIOS image is authentic. Furthermore, in response to a determination that the new BIOS image is authentic, the data processing system may copy the new BIOS image from a primary partition to a rollback partition.

In one embodiment, the data processing system uses an update flag to inform the BIOS of a need to synchronize its primary and rollback images. Also, a secrets flag is set by the ACM whenever part of the MLE (e.g., an OS) uses methods from a package such as Intel TXT to create secrets like passwords, keys, etc. The secrets flag may be maintained and updated by the ACM, and it may reside in the TPM. The ACM may also use a rollback flag to drive a switch to the rollback region, to force authentication of a new BIOS image in the primary region. Thus, the rollback flag is a mechanism to trigger a self-measured boot path for the BIOS, in which the rollback BIOS plays a greater role than just recovery—the rollback BIOS also plays important rolls in BIOS authentication and auto-promotion. For instance, the rollback BIOS clears the secrets flag (if set) when a new BIOS passes self-authentication, so that the new BIOS can be auto-promoted by the ACM. This will prevent the ACM from locking the memory controller and bricking the system when the BIOS upgrade was performed by a trustworthy source and the BIOS is authentic. The rollback BIOS also enables a robust method to enforce a self-authentication process to occur whenever the BIOS is upgraded, regardless of the secrets flag. For instance, in one embodiment, the rollback BIOS always ensures that any BIOS upgrade must pass self-authentication before the new BIOS can gain control of the system, regardless of the state of the Secrets flag; and the ACM always ensures that the active BIOS is authentic according to a BIOS measurement in the TPM.

In one embodiment, there is no need to disable Intel TXT during the upgrade. In addition, it is possible to upgrade both the primary BIOS and the rollback BIOS to keep them compatible with hardware upgrades or changes. Because the rollback BIOS is synced up after every successful authenticated BIOS upgrade, it remains up-to-date and in sync with the latest hardware pedigree/upgrades. This is not possible with a conventional fail-safe BIOS which involves a fixed fail-safe BIOS that is programmed one time in the factory and never upgraded thereafter.

And since the BIOS according to the present disclosure performs self-authentication, the BIOS does not need to involve other components when performing the authentication, and it does not need to re-provision the TPM after the upgrade. The provider of the original BIOS and the BIOS upgrades may be an IBV, and the entire infrastructure needed to authenticate the BIOS upgrades may be built into the BIOS itself, in conjunction with supporting components, such as a public key for the IBV stored in the TPM. Thus, no additional BIOS upgrade tools are needed to install a new BIOS image.

To create a new BIOS image, the IBV or OEM may use a tool that manually measures the BIOS image binaries and then creates a digital signature from this measurement using the converse hashing mechanism of SELF_AUTH and the private key of the OEM or IBV. The tool then creates a BIOS package with the digital signature embedded in place in its dedicated offset in the binary. When this binary is subsequently loaded into the primary BIOS partition in flash, it will have the digital signature set in place at its dedicated location for the rollback BIOS to access and perform the SELF_AUTH operation to validate the BIOS package after upgrade.

Also, the upgrade process may be completed without supplying the ACM with a list of known good BIOS signatures.

As will be evident to those or ordinary skill in the art, the overall system flow illustrated herein actually includes several sub-flows for each participant component. For example, the processor flow has its own goals and purpose, as does the ACM flow.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same embodiment or different embodiments, and those embodiments are combinable into other embodiments.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Also, unless expressly specified otherwise, components that are described as being coupled to each other, in communication with each other, responsive to each other, or the like need not be in continuous communication with each other and need not be directly coupled to each other. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, configuration settings, and other kinds of data. As described above, when the data is accessed by a machine, the machine may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions for another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. Many different embodiments include, without limitation, the features described in the following paragraphs.

(A) A data processing system comprises a primary basic input/output system (BIOS) image in a primary BIOS region and a rollback BIOS image in a rollback BIOS region. A method for upgrading the BIOS comprises the operation of establishing a measured launch environment (MLE). In response to a BIOS update request, the primary BIOS image is replaced with a new BIOS image while the MLE is running. After a reset operation, the data processing system automatically boots to the rollback BIOS and automatically determines whether the new BIOS image is authentic. In response to a determination that the new BIOS image is authentic, the data processing system copies the new BIOS image from the primary BIOS region to the rollback BIOS region.

(B) In a method according to paragraph (A), the operation of establishing the MLE comprises (i) during a boot process for the data processing system, automatically determining whether the primary BIOS image is authentic; and (ii) in response to determining that the primary BIOS image is authentic, automatically executing the primary BIOS image.

(C) In a method according to paragraph (A), the operation of establishing the MLE comprises automatically determining whether a current BIOS image is authentic, wherein the current BIOS image comprises the primary BIOS image or the rollback BIOS image. The method further comprises (i) automatically determining whether a secrets flag is set; and (ii) in response to determinations that the current BIOS image is not authentic and the secrets flag is set, locking a memory controller of the data processing system.

(D) A method according to paragraph (A) further comprises automatically determining whether the rollback BIOS image is authentic. Also, the operations of automatically booting to the rollback BIOS and automatically determining whether the new BIOS image is authentic are performed only after determining that the rollback BIOS image is authentic.

(E) A method according to paragraph (A) further comprises automatically rebooting to the new BIOS image after copying the new BIOS image from the primary BIOS region to the rollback BIOS region.

(F) In a method according to paragraph (A), the new BIOS image comprises a digital signature created by a trusted entity with a private key. Also, the operation of automatically determining whether the new BIOS image is authentic comprises using the digital signature and a public key of the trusted entity to determine whether the new BIOS image is authentic.

(G) A method according to paragraph (G) further comprises retrieving the public key from a trusted platform module (TPM) of the data processing system.

(H) In a method according to paragraph (A), the primary BIOS region and the rollback BIOS region are protected regions of nonvolatile memory.

(I) A method according to paragraph (A) further comprises using an authenticated code module (ACM) to automatically set a BIOS rollback flag after replacing the primary BIOS image with the new BIOS image. Also, the BIOS rollback flag can only be modified by the ACM.

(J) A method according to paragraph (A) further comprises setting a BIOS update flag in response to the BIOS update request. Also, the operation of copying the new BIOS image from the primary BIOS region to the rollback BIOS region is performed in response to a determination that the BIOS update flag is set. The method further comprises automatically clearing the BIOS update flag after copying the new BIOS image from the primary BIOS region to the rollback BIOS region.

(K) In a method according to paragraph (J), the BIOS update flag is stored in nonvolatile memory.

(L) A method according to paragraph (A) further comprises (i) automatically setting a BIOS rollback flag in response to a determination that the primary BIOS is not authentic, and (ii) resetting the data processing system after automatically setting the BIOS rollback flag. Also, the operation of automatically booting to the rollback BIOS is performed, based on the BIOS rollback flag, after automatically setting the BIOS rollback flag and resetting the data processing system.

(M) A method according to paragraph (L) further comprises (i) in response to the BIOS update request, automatically setting a BIOS update flag; (ii) after automatically setting the BIOS rollback flag and resetting the data processing system, automatically determining whether the rollback BIOS image is authentic; and (iii) in response to a determination that the rollback BIOS image is authentic, automatically determining whether the BIOS update flag is set. Also, the data processing system performs the operation of automatically determining whether the new BIOS image is authentic in response to determining that the BIOS update flag is set.

(N) A method according to paragraph (M) further comprises, after automatically booting to the rollback BIOS, and in response to a determination that the new BIOS image is authentic, (i) automatically clearing the BIOS rollback flag, (ii) automatically clearing secrets from memory of the data processing system, (iii) automatically clearing a secrets flag, and (iv) automatically resetting the data processing system.

(O) In a method according to paragraph (A), the primary BIOS image comprises a first BIOS image, the new BIOS image comprises a second BIOS image, and the BIOS update request comprises a first BIOS update request. Also, the method further comprises (i) after copying the second BIOS image from the primary BIOS region to the rollback BIOS region, in response to a second BIOS update request, replacing the second BIOS image in the primary BIOS region with a third BIOS image; and (ii) automatically using the second BIOS image in the rollback BIOS region to determine whether the third BIOS image is authentic.

(P) Furthermore, the features of paragraph (A) may be combined with the features described in any one or more of paragraphs (B) through (O).

(Q) At least one machine accessible medium comprises technology for upgrading a basic input/output system. The machine accessible medium comprises instructions which, when executed by a data processing system, cause the data processing system to perform the operations recited in any of paragraphs (A) through (O).

(R) At least one machine accessible medium comprises technology for upgrading a basic input/output system. The machine accessible medium comprises instructions which, when executed by a data processing system, cause the data processing system to perform the operations recited in paragraph (A), combined with the operations described in any one or more of paragraphs (B) through (O).

(S) A data processing system comprises technology for upgrading a basic input/output system. The data processing system comprises a processor and at least one machine accessible medium responsive to the processor. The machine accessible medium comprises instructions which, when executed by the data processing system, cause the data processing system to perform the operations recited in any of paragraphs (A) through (O).

(T) A data processing system comprises technology for upgrading a basic input/output system. The data processing system comprises a processor and at least one machine accessible medium responsive to the processor. The machine accessible medium comprises instructions which, when executed by the data processing system, cause the data processing system to perform the operations recited in paragraph (A), combined with the operations described in any one or more of paragraphs (B) through (O).

For purposes of establishing initial parameters to guide examination of the present application—and without disclaiming, for purposes of rights to be secured with subsequent applications or with further prosecution of the present application, embodiments that may depart in some degree from these initial parameters—what is claimed are all implementations that come within the scope of the following claims and all equivalents to such implementations.

What is claimed is:

1. At least one non-transitory machine accessible medium with technology for upgrading a basic input/output system, the machine accessible medium comprising:
    instructions which, when executed by a data processing system comprising a primary basic input/output system (BIOS) image in a primary BIOS region and a rollback BIOS image in a rollback BIOS region, cause the data processing system to perform operations comprising:
    establishing a measured launch environment (MLE);
    in response to a BIOS update request, replacing the primary BIOS image with a new BIOS image while running the MLE;
    after a reset operation, automatically booting to the rollback BIOS image and automatically determining whether the new BIOS image is authentic; and
    in response to a determination that the new BIOS image is authentic, copying the new BIOS image from the primary BIOS region to the rollback BIOS region.

2. At least one non-transitory machine accessible medium according to claim 1, wherein the operation of establishing the MLE comprises:
    during a boot process for the data processing system, automatically determining whether the primary BIOS image is authentic; and
    in response to determining that the primary BIOS image is authentic, automatically executing the primary BIOS image.

3. At least one non-transitory machine accessible medium according to claim 1, wherein:
    the operation of establishing the MLE comprises automatically determining whether a current BIOS image is authentic, wherein the current BIOS image comprises the primary BIOS image or the rollback BIOS image; and
    the instructions, when executed, cause the data processing system to perform further operations comprising:
        automatically determining whether a secrets flag is set; and
        in response to determinations that the current BIOS image is not authentic and the secrets flag is set, locking a memory controller of the data processing system.

4. At least one non-transitory machine accessible medium according to claim 1, wherein:
    the instructions, when executed, cause the data processing system to automatically determine whether the rollback BIOS image is authentic; and
    the operations of automatically booting to the rollback BIOS image and automatically determining whether the new BIOS image is authentic are performed only after determining that the rollback BIOS image is authentic.

5. At least one non-transitory machine accessible medium according to claim 1, wherein the instructions, when executed, cause the data processing system to automatically reboot to the new BIOS image after copying the new BIOS image from the primary BIOS region to the rollback BIOS region.

6. At least one non-transitory machine accessible medium according to claim 1, wherein:
    the new BIOS image comprises a digital signature created by a trusted entity with a private key; and
    the operation of automatically determining whether the new BIOS image is authentic comprises using the digital signature and a public key of the trusted entity to determine whether the new BIOS image is authentic.

7. At least one non-transitory machine accessible medium according to claim 6, wherein the instructions, when executed, cause the data processing system to retrieve the public key from a trusted platform module (TPM) of the data processing system.

8. At least one non-transitory machine accessible medium according to claim 1, wherein the primary BIOS region and the rollback BIOS region are protected regions of nonvolatile memory.

9. At least one non-transitory machine accessible medium according to claim 1, wherein:
    the instructions, when executed, cause the data processing system to use an authenticated code module (ACM) to automatically set a BIOS rollback flag after replacing the primary BIOS image with the new BIOS image; and
    the BIOS rollback flag can only be modified by the ACM.

10. At least one non-transitory machine accessible medium according to claim 1, wherein:
    the instructions, when executed, cause the data processing system to set a BIOS update flag in response to the BIOS update request;
    the operation of copying the new BIOS image from the primary BIOS region to the rollback BIOS region is performed in response to a determination that the BIOS update flag is set; and
    the instructions, when executed, cause the data processing system to automatically clear the BIOS update flag after copying the new BIOS image from the primary BIOS region to the rollback BIOS region.

11. At least one non-transitory machine accessible medium according to claim 10, wherein the BIOS update flag is stored in nonvolatile memory.

12. At least one non-transitory machine accessible medium according to claim 1, wherein:
    the instructions, when executed, cause the data processing system to perform further operations comprising:

automatically setting a BIOS rollback flag in response to a determination that the primary BIOS is not authentic; and resetting the data processing system after automatically setting the BIOS rollback flag; and the operation of automatically booting to the rollback BIOS image is performed, based on the BIOS rollback flag, after automatically setting the BIOS rollback flag and resetting the data processing system.

13. At least one non-transitory machine accessible medium according to claim 12, wherein:

the instructions, when executed, cause the data processing system to perform further operations comprising:

in response to the BIOS update request, automatically setting a BIOS update flag;

after automatically setting the BIOS rollback flag and resetting the data processing system, automatically determining whether the rollback BIOS image is authentic; and in response to a determination that the rollback BIOS image is authentic, automatically determining whether the BIOS update flag is set; and the operation of automatically determining whether the new BIOS image is authentic is performed in response to determining that the BIOS update flag is set.

14. At least one non-transitory machine accessible medium according to claim 13, wherein the instructions, when executed, cause the data processing system to perform further operations comprising:

after automatically booting to the rollback BIOS image, and in response to a determination that the new BIOS image is authentic:

automatically clearing the BIOS rollback flag;

automatically clearing secrets from memory of the data processing system;

automatically clearing a secrets flag; and automatically resetting the data processing system.

15. At least one non-transitory machine accessible medium according to claim 1, wherein:

the primary BIOS image comprises a first BIOS image;

the new BIOS image comprises a second BIOS image;

the BIOS update request comprises a first BIOS update request; and the instructions, when executed, cause the data processing system to perform further operations comprising:

after copying the second BIOS image from the primary BIOS region to the rollback BIOS region, in response to a second BIOS update request, replacing the second BIOS image in the primary BIOS region with a third BIOS image; and automatically using the second BIOS image in the rollback BIOS region to determine whether the third BIOS image is authentic.

16. A method for upgrading a basic input/output system of a data processing system, the method comprising:

in a data processing system comprising a primary basic input/output system (BIOS) image in a primary BIOS region and a rollback BIOS image in a rollback BIOS region, establishing a measured launch environment (MLE);

in response to a BIOS update request, replacing the primary BIOS image with a new BIOS image while running the MLE;

after a reset operation, automatically booting to the rollback BIOS image and automatically determining whether the new BIOS image is authentic; and in response to a determination that the new BIOS image is authentic, copying the new BIOS image from the primary BIOS region to the rollback BIOS region.

17. A method according to claim 16, wherein the operation of establishing the MLE comprises:

during a boot process for the data processing system, automatically determining whether the primary BIOS image is authentic; and in response to determining that the primary BIOS image is authentic, automatically executing the primary BIOS image.

18. A method according to claim 1, wherein:

the operation of establishing the MLE comprises automatically determining whether a current BIOS image is authentic, wherein the current BIOS image comprises the primary BIOS image or the rollback BIOS image; and the method further comprises:

automatically determining whether a secrets flag is set; and in response to determinations that the current BIOS image is not authentic and the secrets flag is set, locking a memory controller of the data processing system.

19. A method according to claim 1, further comprising:

automatically determining whether the rollback BIOS image is authentic; and wherein the operations of automatically booting to the rollback BIOS image and automatically determining whether the new BIOS image is authentic are performed only after determining that the rollback BIOS image is authentic.

20. A method according to claim 1, further comprising:

automatically rebooting to the new BIOS image after copying the new BIOS image from the primary BIOS region to the rollback BIOS region.

21. A method according to claim 1, further comprising:

using an authenticated code module (ACM) to automatically set a BIOS rollback flag after replacing the primary BIOS image with the new BIOS image; and wherein the BIOS rollback flag can only be modified by the ACM.

22. A method according to claim 1, further comprising:

automatically setting a BIOS rollback flag in response to a determination that the primary BIOS is not authentic; and resetting the data processing system after automatically setting the BIOS rollback flag; and wherein the operation of automatically booting to the rollback BIOS image is performed, based on the BIOS rollback flag, after automatically setting the BIOS rollback flag and resetting the data processing system.

23. A method according to claim 22, further comprising:

in response to the BIOS update request, automatically setting a BIOS update flag;

after automatically setting the BIOS rollback flag and resetting the data processing system, automatically determining whether the rollback BIOS image is authentic; and in response to a determination that the rollback BIOS image is authentic, automatically determining whether the BIOS update flag is set; and performing the operation of automatically determining whether the new BIOS image is authentic in response to determining that the BIOS update flag is set.

24. A method according to claim 1, wherein the primary BIOS image comprises a first BIOS image, the new BIOS image comprises a second BIOS image, the BIOS update request comprises a first BIOS update request, and the method further comprises:

after copying the second BIOS image from the primary BIOS region to the rollback BIOS region, in response to a second BIOS update request, replacing the second BIOS image in the primary BIOS region with a third BIOS image; and automatically using the second BIOS image in the rollback BIOS region to determine whether the third BIOS image is authentic.

25. A data processing system with technology for upgrading a basic input/output system, the data processing system comprising:

a processor;

at least one non-transitory machine accessible medium responsive to the processor;

a primary basic input/output system (BIOS) region in the at least one machine accessible medium;

a rollback BIOS region in the at least one machine accessible medium;

a primary BIOS image in the primary BIOS region; and a rollback BIOS image in the rollback BIOS region;

wherein the at least one machine accessible medium comprises instructions which, when executed by the data processing system, cause the data processing system to perform operations comprising:

establishing a measured launch environment (MLE);

in response to a BIOS update request, replacing the primary BIOS image with a new BIOS image while running the MLE;

after a reset operation, automatically booting to the rollback BIOS image and automatically determining whether the new BIOS image is authentic; and in response to a determination that the new BIOS image is authentic, copying the new BIOS image from the primary BIOS region to the rollback BIOS region.

26. A data processing system according to claim 25, wherein the operation of establishing the MLE comprises:

during a boot process for the data processing system, automatically determining whether the primary BIOS image is authentic; and in response to determining that the primary BIOS image is authentic, automatically executing the primary BIOS image.

27. A data processing system according to claim 25, wherein:

the instructions, when executed, cause the data processing system to automatically determine whether the rollback BIOS image is authentic; and the operations of automatically booting to the rollback BIOS image and automatically determining whether the new BIOS image is authentic are performed only after determining that the rollback BIOS image is authentic.

28. A data processing system according to claim 25, wherein:

the instructions, when executed, cause the data processing system to perform further operations comprising:

automatically setting a BIOS rollback flag in response to a determination that the primary BIOS is not authentic; and resetting the data processing system after automatically setting the BIOS rollback flag; and the operation of automatically booting to the rollback BIOS image is performed, based on the BIOS rollback flag, after automatically setting the BIOS rollback flag and resetting the data processing system.

29. A data processing system according to claim 28, wherein:

the instructions, when executed, cause the data processing system to perform further operations comprising:

in response to the BIOS update request, automatically setting a BIOS update flag;

after automatically setting the BIOS rollback flag and resetting the data processing system, automatically determining whether the rollback BIOS image is authentic; and in response to a determination that the rollback BIOS image is authentic, automatically determining whether the BIOS update flag is set; and the operation of automatically determining whether the new BIOS image is authentic is performed in response to determining that the BIOS update flag is set.

\* \* \* \* \*